United States Patent
Bruzzone et al.

(10) Patent No.: US 11,253,966 B2
(45) Date of Patent: Feb. 22, 2022

(54) MODULAR FRAME STRUCTURE FOR MACHINING CENTER

(71) Applicant: UNIVERSITA' DEGLI STUDI DI GENOVA, Genoa (IT)

(72) Inventors: Alessandro Arturo Bruzzone, Genoa (IT); Margherita Monti, Genoa (IT); Ivan Rosciano, Toirano (IT)

(73) Assignee: UNIVERSITA' DEGLI STUDI DI GENOVA, Genoa (IT)

( * ) Notice: Subject to any disclaimer, the term of this patent is extended or adjusted under 35 U.S.C. 154(b) by 0 days.

(21) Appl. No.: 16/767,780

(22) PCT Filed: Nov. 29, 2018

(86) PCT No.: PCT/EP2018/083045
§ 371 (c)(1),
(2) Date: May 28, 2020

(87) PCT Pub. No.: WO2019/106104
PCT Pub. Date: Jun. 6, 2019

(65) Prior Publication Data
US 2020/0361046 A1    Nov. 19, 2020

(30) Foreign Application Priority Data
Nov. 30, 2017   (IT) .................. 102017000137650

(51) Int. Cl.
*B23Q 3/18*     (2006.01)
*F16M 1/00*     (2006.01)

(52) U.S. Cl.
CPC ............... *B23Q 3/183* (2013.01); *F16M 1/00* (2013.01)

(58) Field of Classification Search
CPC ........... F16M 1/00; B23Q 3/183; B23Q 1/015
See application file for complete search history.

(56) References Cited

U.S. PATENT DOCUMENTS 2,052,600 A * 9/1936 Boss ...................... B23Q 1/015
                                                        142/1
2,120,194 A * 6/1938 Smith .................... B23Q 1/015
                                                        451/340
(Continued)

FOREIGN PATENT DOCUMENTS

DE          2458287 A1 *  6/1976   ............... F16M 1/00
DE          2814560 A1    11/1978
(Continued)

OTHER PUBLICATIONS

International Search Report dated Feb. 19, 2019 re: Application No. PCT/EP2018/083045, pp. 1-3, citing: EP 1 672 228 A1, U.S. Pat. No. 6,553,875 B1 and DE 28 14 560 A1.
(Continued)

*Primary Examiner* — Eret C Mcnichols
(74) *Attorney, Agent, or Firm* — Cantor Colburn LLP (57) ABSTRACT

A modular frame structure for a machining center which includes at least one modular unit having a first and a second individual module. Each individual module includes two mutually parallel vertical columns, each one extending parallel to a vertical direction; a pair of first horizontal cross-members, each one extending parallel to a first horizontal direction, each horizontal cross-member of the pair of first cross-members being joined to both columns.
The modular unit further includes two pairs of second horizontal cross-members, each horizontal cross-member parallel to a second horizontal direction that is perpendicular to the first horizontal direction.

8 Claims, 5 Drawing Sheets

(56) References Cited

U.S. PATENT DOCUMENTS

| | | | | |
|---|---|---|---|---|
| 5,016,765 | A | * | 5/1991 | Leonardo ............ A47B 47/021 |
| | | | | 211/182 |
| 5,659,652 | A | * | 8/1997 | D'Entremont ......... B23Q 1/015 |
| | | | | 248/73 |
| 5,664,757 | A | * | 9/1997 | Simonis ................... F16M 1/00 |
| | | | | 211/189 |
| 6,231,036 | B1 | * | 5/2001 | Johnson ................. B23C 3/002 |
| | | | | 198/345.1 |
| 6,553,875 | B1 | | 4/2003 | Miyano |
| 2005/0129464 | A1 | * | 6/2005 | Moncus ................ E21B 19/006 |
| | | | | 405/203 |
| 2006/0153653 | A1 | * | 7/2006 | Lu ......................... B23Q 1/015 |
| | | | | 409/235 |
| 2013/0039713 | A1 | * | 2/2013 | Weidman ............... B23Q 1/012 |
| | | | | 409/235 |
| 2015/0014909 | A1 | * | 1/2015 | Andrews, Jr. .......... B23Q 1/015 |
| | | | | 269/58 |
| 2016/0201842 | A1 | * | 7/2016 | Wang ....................... F16M 1/00 |
| | | | | 248/678 |
| 2019/0106273 | A1 | * | 4/2019 | Hess ..................... B65G 11/186 |
| 2020/0398389 | A1 | * | 12/2020 | Cherpurny ............. B23Q 1/015 |
| 2021/0114157 | A1 | * | 4/2021 | Suomi .................. B23Q 37/005 |

FOREIGN PATENT DOCUMENTS

| | | | | | |
|---|---|---|---|---|---|
| DE | 4326387 | A1 | * | 2/1995 | .......... B41F 13/0024 |
| EP | 1672228 | A1 | | 6/2006 | |
| FR | 1517992 | A | * | 3/1968 | ................ F16M 1/00 |
| FR | 2519281 | A1 | * | 7/1983 | ............. B25H 1/005 |
| GB | 2025281 | A | * | 1/1980 | ............. B23Q 37/00 |
| SU | 984798 | A1 | * | 12/1982 | ............. B23Q 3/183 |
| WO | 2017137938 | A1 | | 8/2017 | |

OTHER PUBLICATIONS

IT Search Report dated Jul. 19, 2018 re: Application No. 2017000137650, pp. 1-7, citing: EP 1 672 228 A1, U.S. Pat. No. 6,553,875 B1 and DE 28 14 560 A1.
Written Opinion dated Feb. 19, 2019 re: Application No. PCT/EP2018/083045, pp. 1-5, citing: EP 1 672 228 A1, U.S. Pat. No. 6,553,875 B1 and DE 28 14 560 A1.

* cited by examiner

MODULAR FRAME STRUCTURE FOR MACHINING CENTER

TECHNICAL FIELD

The present disclosure relates to a modular frame structure for a machining center.

In the present disclosure the term "machining center" refers to a system capable of transforming the characteristics of the workpiece by way of operations that can employ subtractive, additive, joining, or plastic deformation processes.

BACKGROUND

In general, a machining center contains the following elements:
- a device that supplies energy, by virtue of which a relative motion coupled between the tool used to carry out the process and the piece is obtained;
- a device for fixing the workpiece;
- a device for conveniently fixing and orientating a tool;
- a device for controlling the three above mentioned elements;
- a device for operating the tool according to the transformation process used.

Below known solutions for machining centers constituted by machine tools are described.

These solution use processes that modify the chemical/physical characteristics of the material being machined such as their geometry or mechanical characteristics.

Other machining centers, apart from machine tools, are for example centers (or stations) for welding, extruding, shearing, assembling, measuring and the like.

Machining centers are, in general, mounted on frame structures (beds) which in turn are placed on the ground, preferably fixed to a concrete foundation slab or the like.

The frame structure plays a particularly important role, as it is the means for transferring not only the weight of the machining center to the ground, but also the vibrations and stresses that are generated during the machining, and in addition acts as a link between the several devices of the machining center; for this reason it is important that the frame structure has great rigidity and stability.

The frame structure is also connected to the pipeline systems for distributing the process fluids (e.g. compressed air, cutting fluids such as lubricant and coolant) that are used to operate the devices of the machining center, and the electrical system of said center.

In order to overcome limitations associated with flexibility and production capacity, over the last 50 years many solutions have been presented which, to various degrees, propose a certain modularity for the machining centers.

A recent example of a reference solution is disclosed in the patent application WO2017137938 by the same Applicant.

Although functional and useful, this solution however has a drawback which is linked especially to the steps of settling the machining center and its reconfiguration (expansion or reduction) to new production requirements, whenever it is, for example, necessary to make longer or shorter the machining line, or provide line's branching. In fact, compared to other solutions, these steps—although simplified—require a certain amount of time and attention in order to consistently adapt the pipeline network for delivering the process fluids and in order to make the connections thereof.

Another known solution is proposed by EP1672228 which shows a device for connecting frame members; although functional, this solution however shares with the previous one the drawback relating to the consistent adaptation of the pipeline network for delivering the process fluids.

SUMMARY

The aim of the present disclosure is providing a modular frame structure that solves the above technical problem, eliminates the drawbacks and overcomes the limitations of the known art by making it possible to simplify, in terms of time and cost, the steps of settling and/or reconfiguring the machining center.

Within this aim, the disclosure provides a modular frame structure that is capable of offering the widest guarantees of reliability and safety in use.

The disclosure further provides a modular frame structure that is easy to build and is economically competitive when compared to the known art.

This aim and these and other advantages which will become better apparent hereinafter are achieved by providing a modular frame structure for a machining center having the features of appended claim 1; the disclosure also provides a machining center according to the respective appended claim and a use of said modular frame structure as a distribution line for a process fluid in said machining center.

Optional features of the modular frame structure and/or the machining center are shown in the dependent claims, which are to be considered as part of the present description.

BRIEF DESCRIPTION OF THE DRAWINGS

Further characteristics and advantages of the disclosure will become more evident from the description of three preferred, but not exclusive, embodiments of a modular frame structure, illustrated by way of non-limiting example with the aid of the accompanying drawings wherein.

DETAILED DESCRIPTION OF THE DRAWINGS

Figure 1:
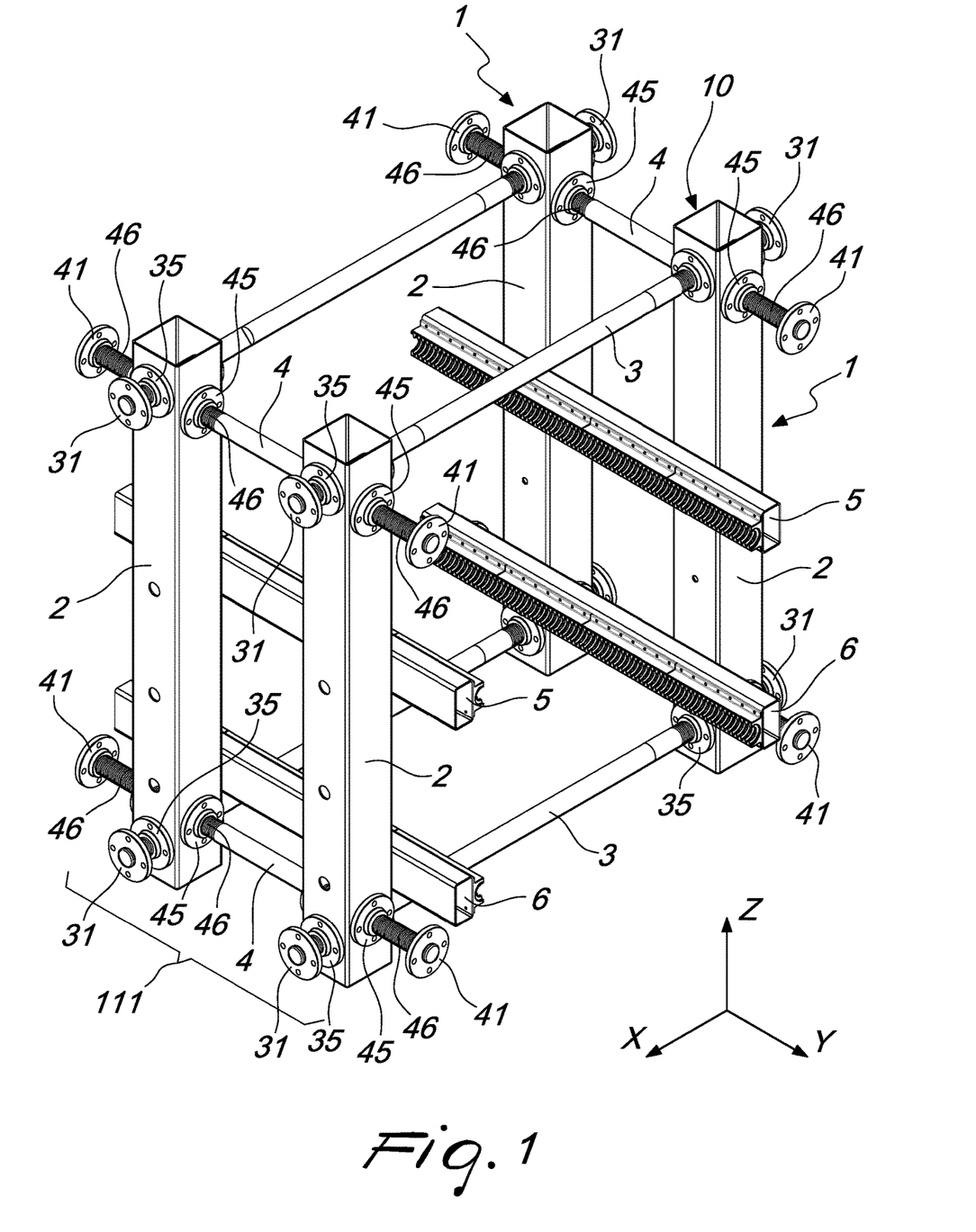
FIG. 1 is a perspective view of a first embodiment of a modular frame structure comprising one modular unit, according to the disclosure.
Figure 2:
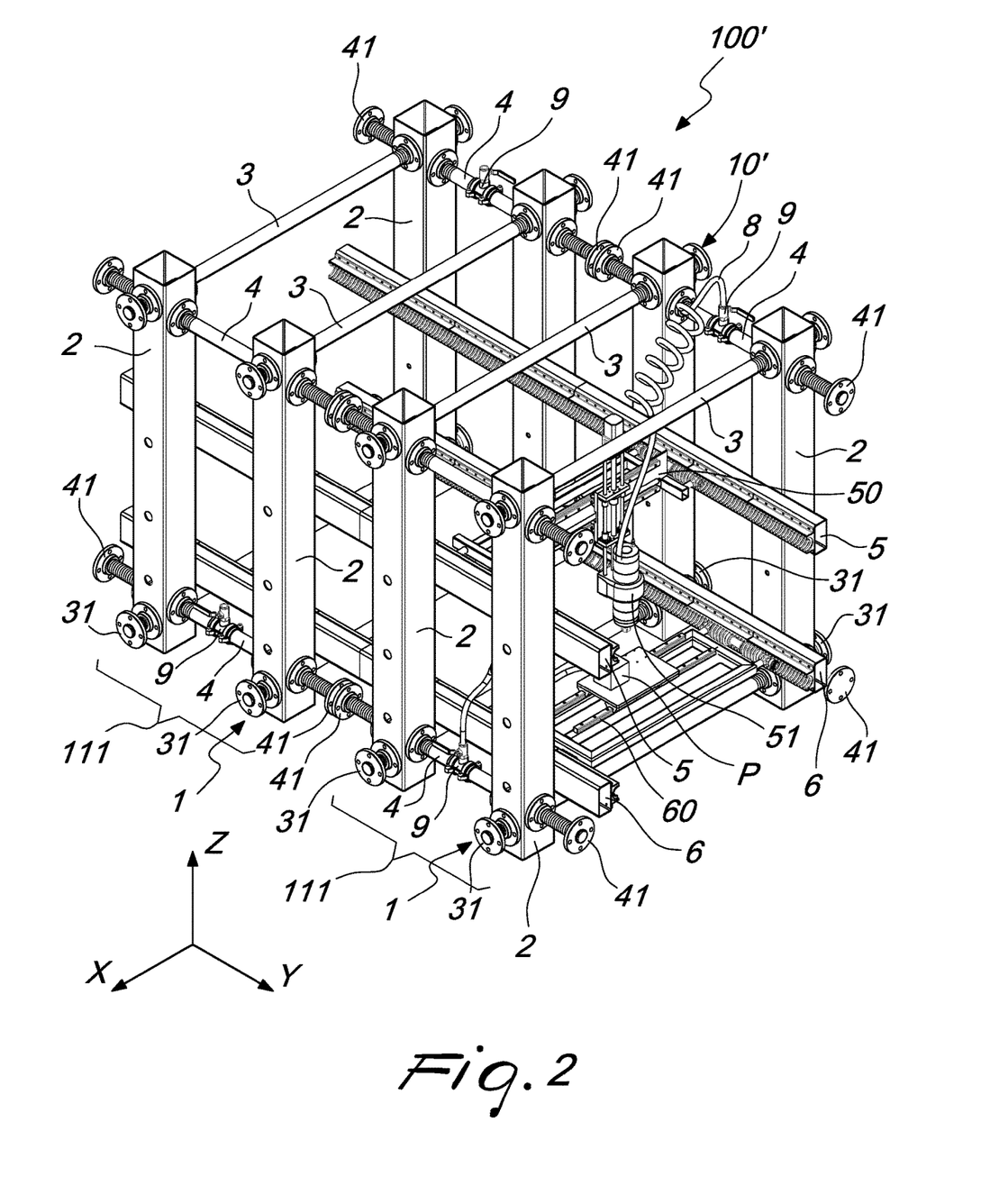
FIG. 2 is a perspective view of a machining center provided with a second embodiment of a modular frame structure, comprising a plurality of connected modular units extending along a first direction Y, according to the disclosure.
Figure 3:
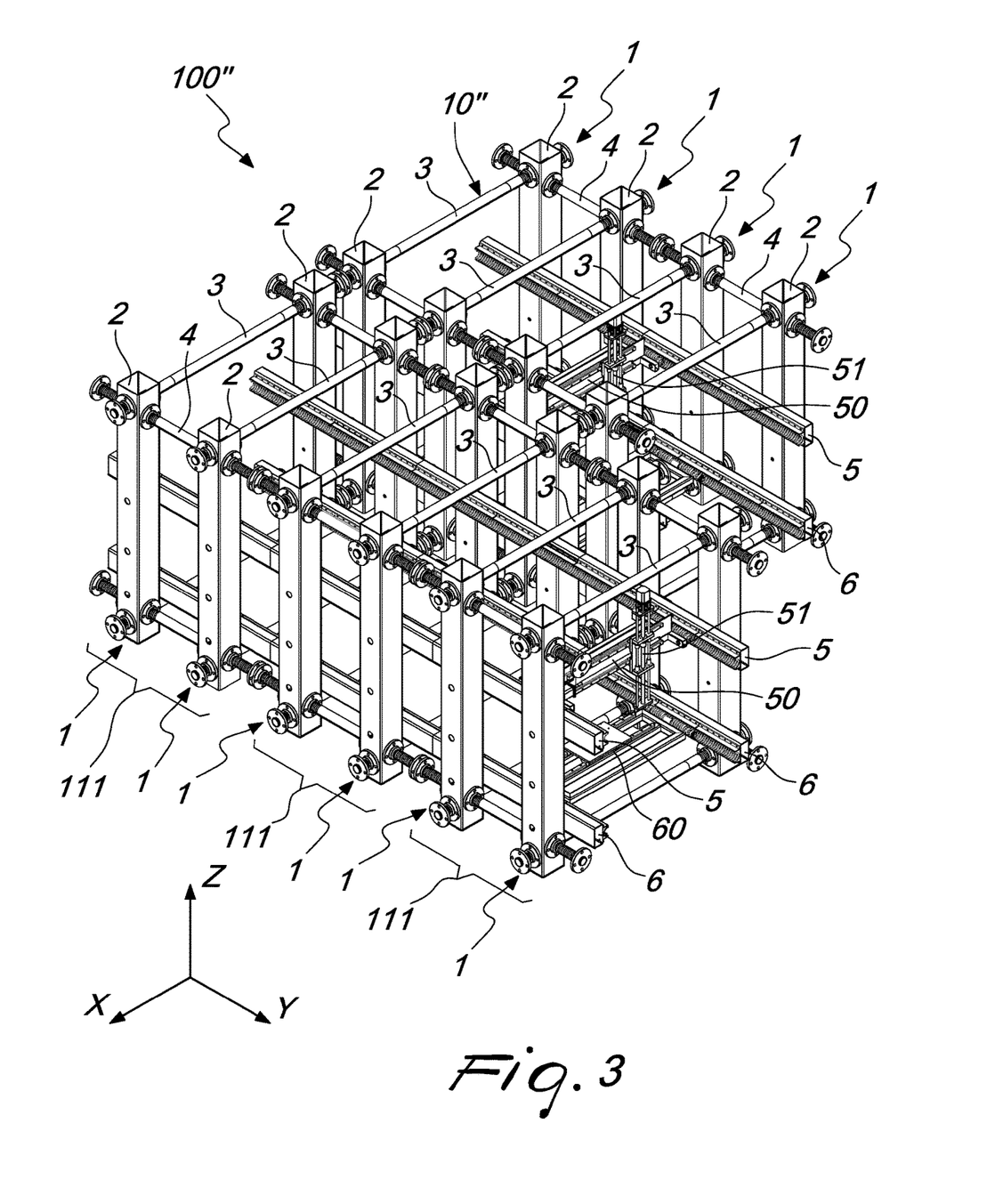
FIG. 3 is a perspective view of a machining center provided with a third embodiment of a modular frame structure, comprising a plurality of connected modular units extending along a first and a second direction, Y, X according to the disclosure.

With reference to the figures, the modular frame structure is generally designated with the reference numerals 10, 10', 10"; FIG. 1 shows a basic embodiment of a modular frame structure 10, while FIGS. 2 and 3 show respectively two machining centers 100', 100" each one of which comprises a modular frame structure (respectively 10' and 10").

Generally, in all the various embodiments, the modular frame structure 10, 10', 10" comprises a plurality of individual units 111 on their turn comprising individual modules 1.

A structural unit 111 is shown in FIG. 1: in this figure the structural unit 111 constitutes the entire modular frame structure 10 in its very basic form (the latter is made by using only one structural unit 111).

Figure 5:
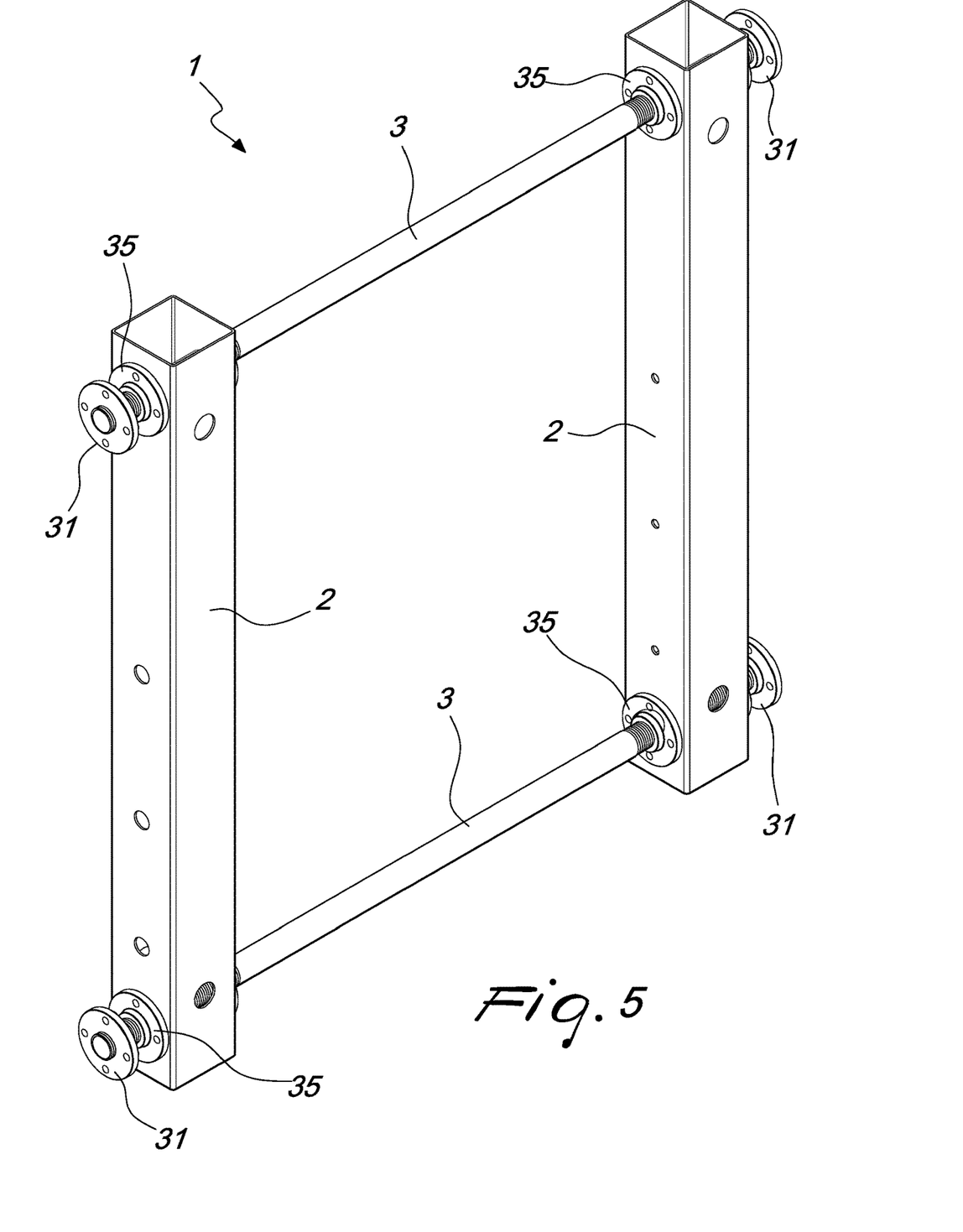
FIG. 5 is a perspective view of a first embodiment of an individual module.

In FIG. 5, in order to present clearly each component of the disclosure, a preferred embodiment of an individual module 1 is shown, Starting to describe the individual module 1, the latter comprises two parallel vertical columns 2, each one extending parallel to a vertical direction Z. The columns 2 are preferably fixed (for example bolted) to a concrete foundation slab on the floor, not shown.

The individual module 1 also comprises a pair of first horizontal cross-members 3, each one of which extends parallel to a first horizontal direction X (perpendicular to the vertical direction Z).

Preferably the pair of first cross-members 3 comprises an upper cross-member and a lower cross-member: the upper cross-member is proximate to the upper end of the columns 2, while the lower cross-member is proximate to the lower end of the columns 2; preferably the cross-members 3 are not resting directly on the floor.

As can be seen, each first horizontal cross-member 3 is coupled to both of the columns 2 of the module 1.

The structural unit 111, as can be seen in FIG. 1 preferably comprises two individual modules 1 (in other, not shown embodiments, there can be one, three, four or more individual modules) and also comprises two pairs of second horizontal cross-members 4, each one parallel to a second horizontal Y direction which is perpendicular to the first horizontal X direction.

Each pair of second cross-members 4 is coupled to a respective column 2 of the individual module 1; in this manner, each column 2 of one individual module is coupled to two second cross-members 4, an upper cross-member and a lower cross-member.

A sectional view of the preferred embodiment of such coupling can be seen in FIG. 4 and will be discussed in the following.

According to the disclosure at least one of the second horizontal cross-members 4 comprises a tubular element that passes (uninterrupted) through the column 2 of individual module 1, extending on opposite sides of the column 2 of the same module 1.

If the structural unit 111 comprises two individual modules 1, then the second cross-members 4 couples together each column 2 of one individual module 1 with another, respective, column 2 of the other module 1 of the same structural unit 111; each second horizontal cross-members 4 comprising a tubular element passes (uninterrupted) through the respective columns 2 of each individual module 1, extending on opposite sides of each column 2 of the modules 1 pertaining to the same structural unit 111.

The same, briefly, applies when a structural unit 111 comprises more than two individual modules: in this case a pair of the second cross-members 4 of the structural unit 111 passes through one column 2 of each individual module 1 connecting those columns 2, while the other pair of second cross members of the structural unit 111 passes through the other column 2 of each individual module 1 connecting on its turn those columns.

Despite the number of individual modules 1 comprised in a certain structural unit 111, the tubular member passes through the columns 2, the latter being provided with a through hole for that purpose. The tubular element protrudes from the opposite sides of each column 2 in which passes through for a certain length.

The two terminal ends of each tubular member of the second cross-members 4 of one structural unit 111, are provided each one with a flanged portion 41 or flanged end 41.

Preferably, as in the examples in FIGS. 1-3, the second horizontal cross-members 4 are constituted by a structural tubular conduit.

With reference now to FIG. 1, the modular frame structure 10 in its basic form comprises one structural unit 111 on its turn comprising two individual modules: this can be seen as the very basic frame structure of the disclosure, at its minimum.

In the more complex embodiment of FIG. 2 the modular frame structure 10' comprises two structural units 111, each one of the latter comprising two individual modules 1.

The four individual modules 1, and therefore the two structural units 111, are in this embodiment aligned along a common axis Y (the columns 2 are displaced along two parallel axes extending in the Y direction, each column 2 of each individual module 1 lying on one of the two axes).

In the even more complex embodiment of FIG. 3, the modular frame structure 10" comprises ten individual modules 1, and therefore five structural units 111 (since also in this example each structural unit 111 comprises two individual modules 1), having, in this example, structural units 111 aligned along axis Y and structural units aligned along the perpendicular axis X, so as to form a sort of a grid.

Preferably, each of the second horizontal cross-members 4 includes a tubular element passing through the aligned columns 2 of the same structural unit 111 extending on opposite sides of each column 2; as already said for the present disclosure it may be sufficient that one second horizontal cross-members 4 comprises said tubular element.

The flanged ending portions 41 are configured for hydraulically connecting in a sealed way the tubular element of the second cross-member 4 of one structural unit 111 to other hydraulic elements, for providing a main distribution pipeline of a process fluid, said main distribution pipeline extending parallel to said second horizontal direction Y.

In FIGS. 2 and 3, for sake of clarity (in order to see each structural unit) the flanged end 41 of two adjacent structural units are shown not completely coupled (the flanged end 41 are shown at a certain distance between them); in operation, when the pipeline constituted by the tubular elements of the second cross-members 4 is operational, the flanged end 41 of two adjacent structural units are abutting on each other, so to define a sealed coupling, allowing the fluid to pass in it without any leak. Briefly, the same applies for flanges 31 of the cross-members 3.

The "hydraulic elements" to which the tubular element (or elements, depending on the embodiment) of the second cross-member 4 are connected in a sealed way (for avoiding leakages) by means of the flanged ending portions 41 are, depending on needs, sources of process fluid, closure caps, valves, tanks, hoses or (as shown in FIGS. 2 and 3) another tubular element of a second cross-member 4 of an adjacent structural unit 111, thus forming a delivery pipeline for the process fluid having a length substantially equal to the elongation of the modular frame structure in the same direction.

As can be seen in FIG. 2, for example, the tubular elements of the second cross-member 4 of the first structural unit 111 are each by each connected in a sealed way to corresponding tubular elements of the second cross-member 4 of the adjacent structural unit 111; briefly the same applies to the modular frame structure 10" of FIG. 3. Thus, by connecting the ending flanges 41 of one tubular element of the second cross-member 4 of one structural unit 111 to the ending flanges 41 of another tubular element of the second cross-member 4 of another adjacent structural unit 111, it is therefore possible to provide a main distribution pipeline of a process fluid; the main distribution pipeline will have as many distribution channels as the number of the tubular elements: in the example in the figures, given that each second cross-member 4 comprises a tubular element, then the main distribution pipeline will comprise four different channels (one for each second cross-member 4).

Such main distribution pipeline extends parallel to the second horizontal Y direction: the process fluid, once fed in a tubular element of a second cross-member 4 can be delivered by the latter along the entire elongation (in the Y direction) of the frame structure itself so to be supplied in different working areas, depending on the needs.

The term "process fluid" is intended to mean any fluid (liquid or gas) that is used by the machining center (or, rather, by its devices) for its operation: for example, the working fluid could be compressed air, industrial gas, coolant liquid, lubricant liquid, cutting liquid or the like.

Advantageously, when the modular frame structure is assembled or reconfigured (by lengthening or shortening, by adding or subtracting individual units) along the Y direction, at the same time the main distribution pipeline of the working fluid is also assembled (or adapted), without requiring any operations dedicated to that specific purpose, since the main distribution pipeline components (i.e. the tubular elements forming the distribution pipeline) are themselves a structural part of the modular frame structure).

The modular frame structure 10, 10', 10" according to the disclosure therefore integrates both the structural function, for reacting to forces and for supporting the weight of the machining center, and the function of delivering the used fluids.

Preferably (as in the examples shown) each horizontal cross-member 4 is constituted by a cylindrical pipe (preferably metallic, so as to carry out the structural function beside the fluid delivery function).

The tubular horizontal cross-member 4 passes through the column 2, in a special seat or through hole provided in it, and is joined to the column 2 in a fixed position.

In the examples shown in FIGS. 1-4, the joining of the tubular cross-member 4 with the column 2 occurs by virtue of the tightening flanges 45; in other embodiments different coupling means can be provided instead of the tightening flanges 45, for example by use of welding or threaded connections.

Back to the preferred embodiment of the figures, for each joining of a tubular cross-member 4 and a column 2, there are two tightening flanges 45 arranged on the cross-member 4 on opposite sides of the column 2.

Figure 4:
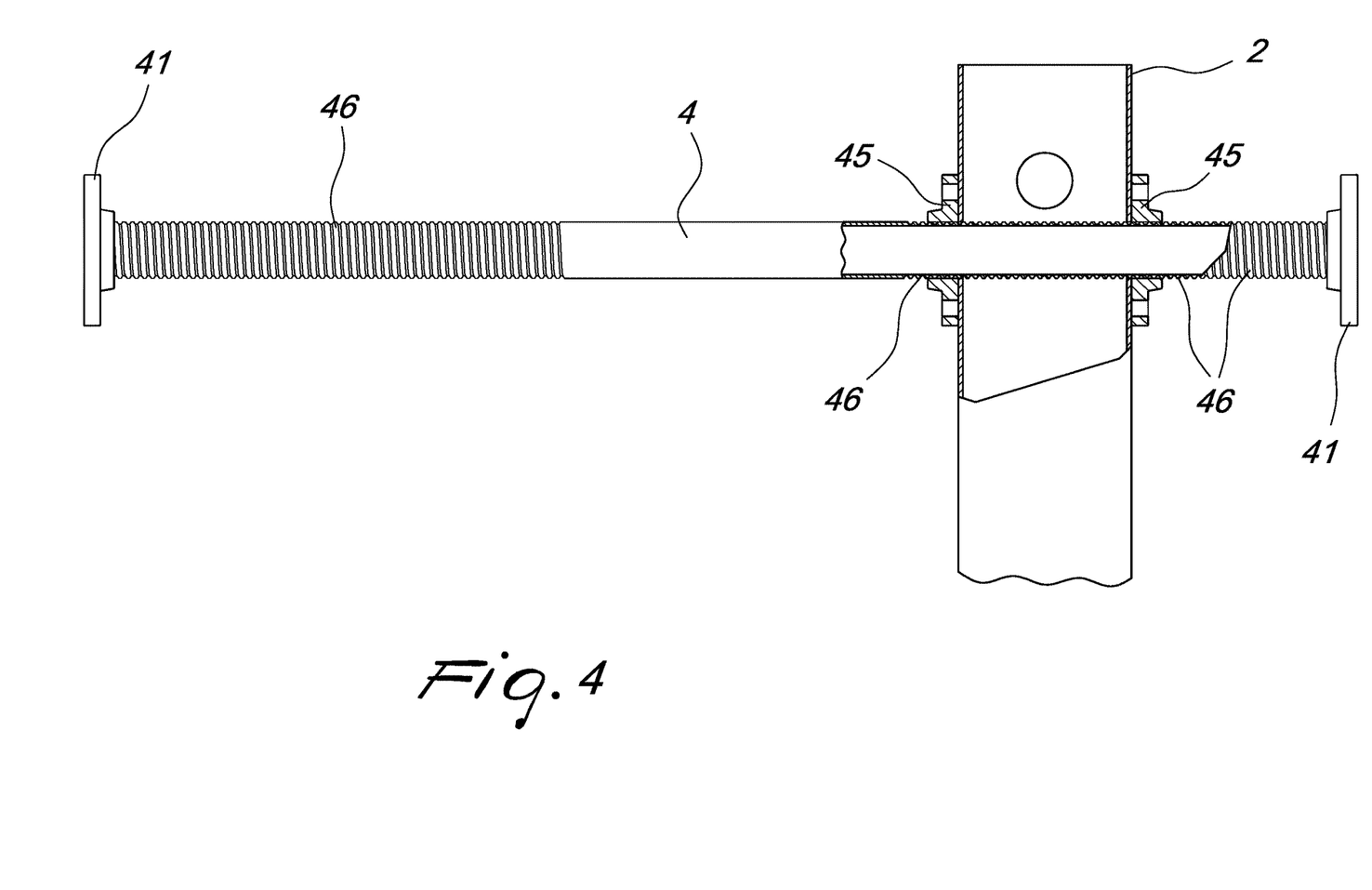
FIG. 4 is a sectional view of part of FIG. 1.

The tightening flanges 45 are engaged by screwing on a threaded portion 46 of tubular cross-member 4, in such a way that, once the tubular cross-member 4 is made to pass through the column 2, the two are joined by screwing the flanges 45 which go into abutment against the column 2, thus rendering the latter and the corresponding cross-member rigidly coupled, as can be seen in FIG. 4.

Preferably each cross-members 4 is cylindrical or has at least cylindrical portions on which the threaded portion 46 is provided; preferably each cross-member is metallic, more preferably made by steel or iron or cast iron or aluminum or metallic alloys suitable for exerting a sufficient structural strength (the latter depending mainly on the machining center dimension, weight and function).

As already said, according to the disclosure, the flanged ending portions (or ends) 41 of the tubular elements of the second cross-members 4 are configured for coupling in a sealed manner said tubular element of the second cross-members 4 of one structural unit 111 preferably to another tubular element of a second cross-members 4 of a different structural unit 111.

In this way, one tubular element of the second cross-members 4 can be connected to similar flanged ends of adjacent tubular cross-members 4, as shown in FIGS. 2 and 3, so as to provide a hydraulic pipeline that is extended whenever the modular frame structure is lengthened along the Y direction.

Preferably the flanged ending portions 41 comprise a sealing element that ensures a hydraulic seal for the fluids (liquids and/or gases) that are delivered inside the hydraulic pipeline.

Said sealing element can be, depending on fluid nature, a gasket and, more preferably, an elastomeric gasket, a rubber gasket, a metallic gasket (for example made in copper or aluminum) or similar; the gasket itself can be preferably coupled to one flanged ending portion or can be provided as an additional element to be installed between two adjacent flanged ending portions 41 when they are coupled.

In the preferred shown embodiments, the modular frame structures 10, 10', 10" comprise a first transfer guideway 5 for a working movable cross-member 50, extending between at least two adjacent individual modules 1; the first transfer guideway 5 is configured for a working movable cross-member 50, on which working movable cross-member 50 a working head 51 is mounted, the first guideway 5 extending parallel to said second horizontal direction Y.

In the preferred shown embodiments, the modular frame structures 10, 10', 10" further comprise a second transfer guideway 6 for a workpiece-holding table 60, extending along at least two adjacent individual modules 1; the second transfer guideway 6 is configured for a workpiece-holding table 60; the second guideway 6 extend parallel to said second horizontal direction Y.

Preferably the guideways 5 and/or 6 are part of one structural unit 111, joined with the latter for example by welding or threaded connection to the columns 2.

Therefore, the guideways 5 and/or 6 extend parallel to the second horizontal Y direction, so that when the modular frame structure is lengthened, both the guideways 5 and/or 6 and the tubular cross-members 4 are also lengthened, with a considerable advantage in terms of versatility and simplicity of arrangement operations.

The guideways 5 and/or 6 can be of various types, according to requirements: for example, they can contain racks, conveyor belts or the like.

In a particularly advantageous embodiment, the guideways 5 and/or 6 are provided according to the teachings of WO2017137938 by the same Applicant.

In particular the guideway 5 contains a first leadscrew rack which comprises a first circular helical threaded sector.

The leadscrew rack extends along the modular frame structure in a longitudinal direction and for the full extent of the modular frame structure in the first Y direction.

The working movable cross-member 50 comprises a first screw which is rotationally coupled to the movable cross-member 50 by way of a driving assembly.

The screw of the working movable cross-member 50 engages with the corresponding first leadscrew rack, and it has its rotation axis parallel to the Y direction.

The longitudinal extension of the modular frame structure in the Y direction is an integer multiple of the pitch of the threaded leadscrew racks, so as to enable the continuity of the helical engagement and the continuous transfer of the working cross-member 50 along the modular frame structure.

The guideway 6 of the workpiece-holding table 60 is also provided in a similar manner: the guideway 6 comprises a second leadscrew rack which in turn comprises a second circular helical threaded sector.

In certain embodiment only one guideway, 5 or 6, is present; if both the guideway 5 and the guideway 6 are present, the thread pitch of one of the two is preferably the same as the other or an integer multiple thereof.

Also, with regard to the guideway 6, the leadscrew rack preferably extends along the modular frame structure in a longitudinal direction parallel to the Y direction for the entire extension of the modular frame structure in the Y direction.

The workpiece-holding table 60 comprises a rotating motorized second screw which engages with the corresponding second leadscrew rack.

The second screw has its rotation axis parallel to the Y direction.

In this manner the continuous transfer of the workpiece-holding table 60 along the modular frame structure is achieved.

The workpiece-holding table 60 can optionally be provided with a workpiece-holding tray that can move parallel to the X axis so as to move the workpiece P being worked, which is fixed on the tray.

On the working movable cross-member 50, a working head 51 is mounted which can be of various types according to requirements, for example for machining with chip removal operations, welding operations or the like.

Similarly, to the tray of the workpiece-holding table, the working head 51 preferably can move along the working movable cross-member 50 according to an axis parallel to the X direction.

The movement of the tray and/or of the working head on the respective supports (table, cross-member) is achieved preferably by way of linear guideways or rails, in a manner known to the person skilled in the art and which will not be further discussed here.

As it is now apparent from the above description, the main distribution pipeline comprises preferably a plurality of portions of tubular elements coupled together in a sealed manner, so as to act as a pipeline for distributing the process fluid; in this sense, the pipeline has to be seen as "integrated" in the modular frame structure 10, 10', 10" for said machining center 100', 100", and extends over a plurality of individual adjacent modular units 111 by a sealed coupling between the tubular members of each modular unit 111.

Returning to the modular frame structure, and with specific reference to FIGS. 1 and 3, optionally at least one, preferably both, of the first horizontal cross-members 3 comprise, similarly to the second cross-members 4, a tubular element that passes through the columns 2 of the individual module 1, so as to provide a secondary delivery pipeline of a process fluid, the second (or auxiliary) delivery pipeline extending parallel to the first horizontal X direction.

Also in this case the tubular element of the first horizontal cross-members 3 passes uninterrupted through the respective column 2 extending on opposite sides of the column 2; the latter is provided with a through hole for that purpose.

The tubular element of the first horizontal cross-members 3 project from the opposite sides of the column 2 for a certain length, ending with two flanged portions 31 or flanged ends 31.

The tubular element of the first horizontal cross-members 3 and the tubular element of the second horizontal cross-members 4 passes (each one uninterrupted) through the same column 2 at different heights. Remaining features relating to the tubular element of the first horizontal cross-members 3 are substantially analogue to those of the tubular element of the second horizontal cross-members 4 and will not be described in more detail here.

The secondary delivery pipeline therefore extends in a direction perpendicular to the primary or principal pipeline, so as to convey the process fluids in the X direction as well, for example when the modular frame structure is extended in that direction.

Preferably the first horizontal cross-members 3 are constituted by pipes, which pass through special seats in the columns 2 and are rigidly joined thereto by way of tightening flanges 35 which are screwed onto threaded portions of the first horizontal cross-members 3, in a manner entirely similar to that described for the second cross-members 4.

FIGS. 2 and 3 generally show a machining center respectively 100' and 100" which comprises a modular frame structure 10' and 10" of the type described above.

The machining centers 100' and 100" further comprise a working head 51 which is mounted on a working movable cross-member 50 and a workpiece-holding table 60 which has already been described.

Both the working movable cross-member 50 and the workpiece-holding table 60 can preferably be moved on respective first and second guideways 50, 60 of the modular frame structure 10', 10", as described above.

The working head 51 and/or the workpiece-holding table 60 are preferably supplied with at least one process fluid, for example compressed air, industrial gas, cutting liquid or the like.

The term "supplied" as used here means that the working head 51 and/or the workpiece-holding table 60 can be variously fed with such process fluids, which are then used according to requirements: for example if the working head 51 is a device for chip removing machining, then the process fluid could be compressed air used to change the cutting tools; if the working head 51 is an inert-gas welder (e.g. TIG, MIG), then the process fluid could be an inert gas used in the welding process; if the workpiece-holding table 60 supports a workpiece being machined by a chip removing process, the process fluid could be a cutting fluid intended to be poured on the workpiece in order to cool it and reduce friction.

To this end the machining centers 100', 100" comprise at least one delivery pipeline of the at least one process fluid, such main distribution pipeline comprising a tubular element of a horizontal cross-member 3, 4.

Preferably along the tubular horizontal cross-member 3 and/or 4, there are branch connectors 9, such as mechanical-T outlet or the like, optionally provided with valves, for connecting thereof with hoses 8, preferably flexible, which are functionally attached to the working head 51 and/or to the working cross-member 50 and/or to the workpiece-holding table 60 for the purposes described above.

Optionally, the machining center 100', 100" comprises also at least one source of process fluid (for example a tank containing the process fluid optionally provided with pumping means and/or valves) operationally coupled with the main or secondary distribution pipelines, so to deliver (or collect) the process fluid.

The disclosure therefore a use of a modular frame structure as claimed as a distribution pipeline for a process fluid in a machining center.

Operation of the disclosure is clear and evident from the foregoing description.

In practice it has been found that the modular frame structure and the machining center that comprises it, according to the present disclosure, achieve the intended aim and advantages since they make it possible to provide a modular structure with simplified assembly and which also integrates, in the structural elements of the frame, the hydraulic pipelines for one or more process fluids, so that an adaptation of the modular frame structure (e.g. lengthening or shortening in the X and/or Y direction) corresponds simultaneously to an adaptation of the hydraulic circuit, thus enabling a substantial saving of time and simplification of work.

Another advantage of the modular frame structure and of the machining center that comprises it, according to the disclosure, is that it offers great rigidity together with low cost: in fact the columns 2 can be provided by way of internally hollow metallic profiles and the horizontal cross-members 3 and 4 can be provided by way of metallic pipes, both elements that are easily sourced and low cost overall.

The modular frame structure and the machining center that comprises it, thus conceived, are susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements.

The disclosures in Italian Patent Application No. 102017000137650 from which this application claims priority, are incorporated herein by reference.

The invention claimed is:

1. A modular frame structure for a machining center, which comprises at least one modular unit, said modular unit comprising on its turn a first and a second individual module, each individual module comprising:
two mutually parallel vertical columns, each vertical column extending parallel to a vertical direction;
a pair of first horizontal cross-members, each horizontal cross-member extending parallel to a first horizontal direction, each horizontal cross-member of the pair of first cross-members being joined to both columns; and
said modular unit further comprising two pairs of second horizontal cross-members, each horizontal cross-member parallel to a second horizontal direction that is perpendicular to the first horizontal direction,
each of said vertical columns of said first individual module being connected with a respective vertical column of said second individual module by means of at least one pair of said second horizontal cross-members,
at least one of the second horizontal cross-members including a tubular element passing through the respective columns of said first and second individual module extending on opposite sides of each column,
said at least one tubular element of the second cross-member comprising flanged ending portions configured for hydraulically connecting in a sealed way the tubular element of the second cross-member to other hydraulic elements for providing a main distribution pipeline of a process fluid, said main distribution pipeline extending parallel to said second horizontal direction.

2. The modular frame structure according to claim 1, wherein at least one of the first horizontal cross-members of an individual module comprises a tubular element that passes through said columns of the same individual module, extending on opposite sides of each column, said tubular element of the at least one first cross-member comprising flanged ending portions configured for hydraulically connecting in a sealed way the tubular element of the first cross-member to other hydraulic elements so as to provide a secondary distribution pipeline of a process fluid, said auxiliary distribution pipeline extending parallel to said first horizontal direction.

3. The modular frame structure according to claim 1, wherein a first transfer guideway for a working movable cross-member is provided, extending along at least two adjacent structural units, on which working movable cross-member a working head is mounted, the first transfer guideway extending parallel to said second horizontal direction.

4. The modular frame structure according to claim 3, wherein a second transfer guideway for a workpiece-holding table is provided, extending along said at least two adjacent structural units, the second transfer guideway extending parallel to said second horizontal direction.

5. The modular frame structure according to claim 3, wherein the first and/or the second cross-members of a structural unit are provided with threaded portions which, in an assembled condition, extend on opposite sides of the respective column, the modular frame structure comprising tightening flanges which are engaged by screw coupling onto said threaded portions for rigidly joining the respective second cross-members to the corresponding column.

6. A machining center comprising a modular frame structure according to claim 1 and further comprising a working head mounted on a working movable cross-member and a workpiece-holding table, which can be moved respectively on a first guideway and on a second guideway of the modular frame structure, said working head and/or said workpiece-holding table being fed with at least one process fluid, the machining center comprising at least one distribution pipeline for the delivery of said at least one process fluid, said distribution pipeline comprising the tubular element of the horizontal cross-member.

7. The machining center according to claim 6, comprising a source of process fluid operationally connected to said distribution pipeline.

8. A method of using the modular frame structure recited in claim 1 as a distribution pipeline for a process fluid in a machining center, the machining center comprising the modular frame structure, a working head mounted on a movable cross-member and a workpiece-holding table, and at least one distribution pipeline for the delivery of said at least one process fluid, said distribution pipeline comprising the tubular element of the horizontal cross-member, the method including the following steps:
mounting a working head on a working movable cross-member and a workpiece-holding table, moving the working movable cross-member and the workpiece-holding table respectively on a first guideway and on a second guideway of the modular frame structure, and feeding said working head and/or said workpiece-holding table with at least one process fluid.

* * * * *